July 14, 1970     M. FRANK ET AL     3,520,412

NEMATODE EXTRACTION DEVICE

Filed March 1, 1968

INVENTOR
MORTON FRANK
& SOL LESH

BY *Zalkind & Horne*

ATTORNEY

United States Patent Office 3,520,412
Patented July 14, 1970

3,520,412
NEMATODE EXTRACTION DEVICE
Morton Frank, 210 W. 19th St., Deer Park, N.Y.
11729, and Sol Lesh, 39 Monterey Drive, New
Hyde Park, N.Y. 11040
Filed Mar. 1, 1968, Ser. No. 709,659
Int. Cl. B01d 37/00
U.S. Cl. 210—73                                    2 Claims

ABSTRACT OF THE DISCLOSURE

The invention relates to a means for extracting nematodes, which are microscopic worms, from soil samples, mud, sand, animal tissues, algae and the like. The principle of operation is based on the ability of living nematodes in a sample of soil or other substratum to pass through a membrane, such as filter paper, to be captured in an external water solution. Primarily, the invention comprises a soil sample chamber and water chamber terminating in a downwardly disposed spout, wherein a soil sample enclosed in filter paper is placed within the sample chamber and inundated with water. Following a period of time, such as 24 hours, the nematodes will be found to have filtrated through the filter paper into the water chamber into the spout, the water of which can be drawn off into an examination dish in small amounts for examination and study of the nematodes therein by a microscope.

---

Briefly, the invention comprises a cap-like funnel having a sample chamber with a removable perforate bottom plate below which is a water chamber having a spout to which a short length of flexible tubing is connected having a V-pinch clamp whereby it can be clamped shut. The funnel is supported on a tripod stand and an examination dish is placed below the end of the tubing, retained by the legs.

The water chamber is filled with water up to the level of the bottom plate and a sample of nematode-carrying material is placed in the filter paper on the perforate plate. The sample is enclosed in filter paper and thoroughly wetted or inundated, thereafter being permitted to stand about 24 hours during which time many nematodes migrate out of the sample through the filter paper and through the perforate bottom plate and the water chamber into the spout. The pinch clamp can then be released slightly to permit small quantities of water from the spout carrying many nematodes to drain into the examination dish for microscope study, staining, slide mounting, etc., in a conventional manner.

In general, all parts of the device can be made cheaply of molded plastic, and the components merchandised as a kit at a very low price for the individual use of students. The readily disassembly of the device for washing and the compactness of the arrangement make the invention particularly well adapted for younger students of high school and junior high school age.

Figure 1:
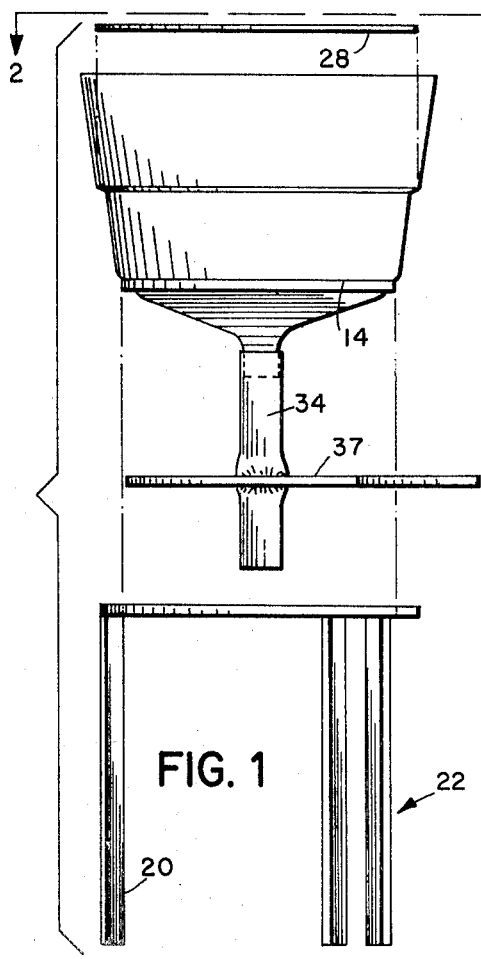
Figure 1A:
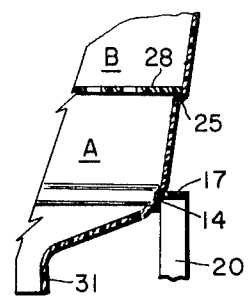
Figure 2:
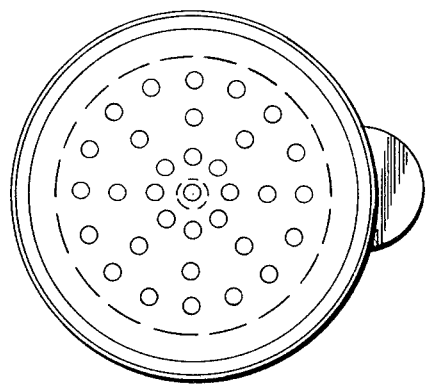
Figure 4:
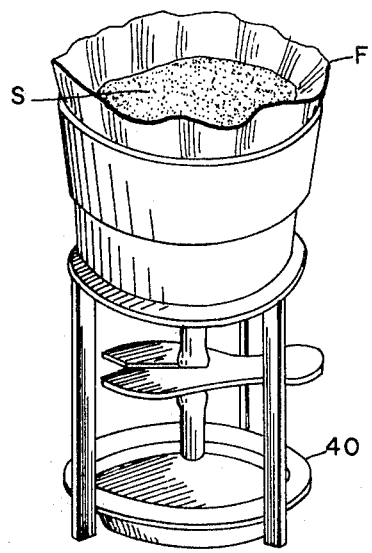
Figure 3:
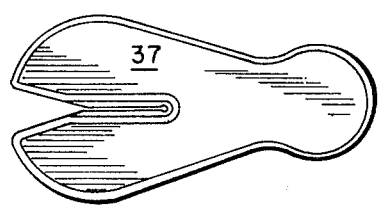

A detailed description of the invention now follows in conjunction with the appended drawing, in which:

FIG. 1 is an exploded elevation of the components;
FIG. 1a is a partial section in elevation showing assembly of the funnel, bottom plate and support stand;
FIG. 2 is a plan view in the direction 2—2 of FIG. 1;
FIG. 3 is a plan view of the pinch clamp; and
FIG. 4 is a perspective of the assembled apparatus.

Referring to the drawing; a cup-like funnel 10 of two to three inches average diameter has a shoulder 14 for a removable seating in a ring 17 which is supported on legs such as 20 forming an open sided tripod stand 22, the ring and legs being integrally molded. The funnel has an upper shoulder 25 to support a removable perforate bottom plate in the form of a disc 28. The lower end of the funnel is formed as a spout 31 on which is telescoped a short length of flexible plastic tubing 34 which can be squeezed flat to prevent flow by a pinch clamp 37 of semi-rigid plastic in the form of a V as shown in FIG. 3. Clamp 37 is accessible through the open sided stand.

An examining dish 40 is dimensioned to be straddled by legs 20 for receiving drainage from tube 34 should clamp 37 be loosened, the amount of drainage being controllable by the operator through suitable manipulation of the clamp.

In use, the chamber A below plate 18 is filled with water up to the level of shoulder 25, preferably plate 18 being immersed at the water surface. A sample of nematode carrying material S is placed in a sheet of filter paper F, the paper being then folded over the top of the sample and water is added to chamber B above shoulder 25 to cover the paper and sample.

The sample is then allowed to stand, without disturbance, for about twenty-four hours during which time nematodes work their way through the filter paper and through chamber A into tube 34. By loosening clamp 37, a small amount of water having a high concentration of nematodes can be released into examining dish 40.

Thereafter, the student may study the living nematodes within the water drained into the dish, under a microscope. The usual staining and slide mounted may be had if desired.

It is claimed:
1. A device of the kind described comprising a stand having a support ring, a funnel carried in said support ring having liquid egress means at its lower end and a closure device therefor; a removable perforate plate; said funnel comprising a pair of chambers divided by said removable perforate plate and said funnel being provided with a shoulder for support of said perforate plate; said funnel being filled with water up to said perforate water plate wherein the surface of said water immerses said plate; a filter element above said plate and carried thereon and containing a wet mass of nematode carrying material whereby nematodes can pass through said filter element and through said perforate plate into the water in the chamber therebelow and ultimately descend to said liquid egress means to be released as required.

2. A method of extracting nematodes from a nematode carrying material which comprises enveloping said material in filter paper and immersing said enveloped material with the filter paper therearound in water while supporting the same on a perforate plate disposed in contact with a body of water therebelow; permitting nematodes to pass through said filter paper and through said plate into the body of water therebelow; and subsequently removing water rich in nematodes from the bottom of said body of water.

References Cited

UNITED STATES PATENTS

| 890,724 | 6/1968 | Stocking | 210—249 X |
| 1,014,843 | 1/1912 | Nobles | 210—249 X |
| 2,612,160 | 9/1952 | Barr | 210—477 X |

FOREIGN PATENTS

| 60,688 | 4/1891 | Germany. |

JOHN W. ADEE, Primary Examiner

U.S. Cl. X.R.
210—250, 477